US011135935B2

(12) United States Patent
Ono et al.

(10) Patent No.: US 11,135,935 B2
(45) Date of Patent: Oct. 5, 2021

(54) VEHICLE CHARGING SYSTEM (71) Applicant: Toyota Jidosha Kabushiki Kaisha, Toyota Aichi-ken (JP)

(72) Inventors: Tomoya Ono, Toyota (JP); Koichi Kojima, Toyota (JP); Akito Motohira, Toyota (JP); Takeshi Aridome, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 16/715,630

(22) Filed: Dec. 16, 2019

(65) Prior Publication Data

US 2020/0198490 A1 Jun. 25, 2020

(30) Foreign Application Priority Data

Dec. 19, 2018 (JP) .............................. JP2018-237381

(51) Int. Cl.
*B60L 53/62* (2019.01)
*H02J 7/00* (2006.01)
*B60L 53/66* (2019.01)
*B60L 50/64* (2019.01)
*B60L 53/16* (2019.01)
*B60L 53/18* (2019.01)

(52) U.S. Cl.
CPC .............. *B60L 53/62* (2019.02); *B60L 50/64* (2019.02); *B60L 53/16* (2019.02); *B60L 53/18* (2019.02); *B60L 53/66* (2019.02); *H02J 7/00032* (2020.01); *H02J 7/0045* (2013.01); *H02J 7/0047* (2013.01); *H02J 7/007182* (2020.01)

(58) Field of Classification Search
CPC ........................................................ B60L 53/62
USPC ........................................................ 320/109
See application file for complete search history.

(56) References Cited

U.S. PATENT DOCUMENTS

2009/0212627 A1* 8/2009 Sakata ................. B60L 3/0046
307/10.7
2012/0091954 A1* 4/2012 Matsuki ............... B60L 3/0069
320/109
2012/0191294 A1* 7/2012 Boiron ............... G01R 31/3278
701/33.8
2015/0183328 A1* 7/2015 Kusch .................... B60L 50/40
320/109

(Continued)

FOREIGN PATENT DOCUMENTS

JP 2011-114961 A 6/2011

*Primary Examiner* — Jerry D Robbins
(74) *Attorney, Agent, or Firm* — Dinsmore & Shohl LLP (57) ABSTRACT An ECU included in a vehicle performs a first charging control when a minimum output voltage of a direct-current (DC) charger obtained through an information exchange process is less than or equal to a lower limit charging voltage for a power storage device, and performs a second charging control when the minimum output voltage is higher than the lower limit charging voltage of the power storage device. In the second charging control, initially, the ECU electrically connects a pre-charge circuit to a charging path from the DC charger to the power storage device, starts DC charging, and checks a voltage that is actually applied from the DC charger to the vehicle. If a voltage applied from the DC charger to the vehicle is a value corresponding to the voltage of the power storage device, the ECU permits the DC charging and performs the first charging control.

3 Claims, 4 Drawing Sheets (56) References Cited

U.S. PATENT DOCUMENTS

| | | | |
|---|---|---|---|
| 2016/0009193 A1* | 1/2016 | Yang | B60L 3/04 |
| | | | 307/10.1 |
| 2017/0166065 A1* | 6/2017 | Hong | H02J 7/00 |
| 2019/0173292 A1* | 6/2019 | Kim | H02J 7/007 |
| 2020/0052508 A1* | 2/2020 | Thayer | H02J 7/0063 |

* cited by examiner

VEHICLE CHARGING SYSTEM

CROSS REFERENCE TO RELATED APPLICATIONS

This nonprovisional application claims priority to Japanese Patent Application No. 2018-237381 filed on Dec. 19, 2018 with the Japan Patent Office, the entire content of which is hereby incorporated by reference.

BACKGROUND

Field

The present disclosure relates to a vehicle which charges a power storage device mounted in the vehicle, using power supplied from a charger outside the vehicle.

Description of the Background Art

Vehicles are popular which perform direct current (DC) charging in which the vehicle charges a power storage device mounted in the vehicle, using DC power supplied from a charger outside the vehicle. In the following, the charger which supplies the DC power is also referred to as a "DC charger."

For the DC charging, a method is known in which, prior to the start of the DC charging, an information exchange process is performed between the vehicle and the DC charger and the compatibility between the vehicle and the DC charger is determined using the exchanged information.

For example, Japanese Patent Laying-Open No. 2011-114961 discloses a charging system in which an upper limit charging voltage and a maximum output voltage are used to determine the compatibility between the vehicle and the DC charger, the upper limit charging voltage being an upper limit of a voltage applicable to the power storage device mounted in the vehicle, the maximum output voltage being an upper limit of a voltage that can be output to the DC charger. In the charging system, the upper limit charging voltage is transmitted from the vehicle to the DC charger and the maximum output voltage is transmitted from the DC charger to the vehicle in the information exchange process. If the maximum output voltage is greater than or equal to the upper limit charging voltage, the vehicle determines that the vehicle and the DC charger are compatible, and permits the DC charging. In contrast, if the maximum output voltage is lower than the upper limit charging voltage, the vehicle determines that the vehicle and the DC charger are not compatible, and does not permit the DC charging.

SUMMARY

One can contemplate that a lower limit charging voltage and a minimum output voltage may additionally be used to determine the compatibility between the vehicle and the DC charger, the lower limit charging voltage being a lower limit voltage that is applicable to the power storage device included in the vehicle, the minimum output voltage being a lower limit voltage that can be output from the DC charger. In this case, in the information exchange process, the information on the lower limit charging voltage and the minimum output voltage are exchanged between the vehicle and the DC charger, and if the minimum output voltage is less than or equal to the lower limit charging voltage, it is determined that the DC charger and the vehicle are compatible. In contrast, if the minimum output voltage is higher than the lower limit charging voltage, it is determined that the DC charger and the vehicle are not compatible, and the DC charging is not permitted. This is for the following reasons.

The voltage to be applied from the DC charger to the vehicle (charging port) during the DC charging is set to a value corresponding to the voltage of the power storage device at that time. The value corresponding to the voltage of the power storage device refers to a value which is greater than or equal to the voltage of the power storage device and whose a difference from the voltage of the power storage device is within a given value (described below). When the DC charging is started while the voltage of the power storage device is at the lower limit charging voltage, if the minimum output voltage is higher than the lower limit charging voltage, a voltage that is higher than the lower limit voltage is to be applied from the DC charger. In other words, the DC charger is unable to output voltage having the value corresponding to the voltage (the lower limit charging voltage) of the power storage device at that time. Consequently, an overcurrent may flow through the power storage device, resulting from the differential pressure between the voltage of the power storage device and the voltage applied from the DC charger. For this reason, the DC charging is not permitted if the minimum output voltage is higher than the lower limit charging voltage.

Here, it was found that, of the existing DC chargers, there are DC chargers (hereinafter, also referred to as a "specific DC charger") which, in the information exchange process prior to the start of DC charging, sets the minimum output voltage to a value higher than an original value (the minimum output voltage that can actually be output from the DC charger) and transmits it to the vehicle. With such specific DC chargers, it may happen that, although the vehicle and the DC charger are determined to be not compatible because the minimum output voltage is higher than the lower limit charging voltage, the vehicle and the DC charger are actually compatible if the true minimum output voltage of the specific DC charger is compared with the lower limit charging voltage. For this reason, if the DC charger which is used to perform the DC charging on the vehicle is a specific DC charger, the determination as to whether to permit the DC charging which is made based only on a result of the determination of the compatibility using the information exchanged in the information exchange process, can result in the DC charging for the vehicle being not permitted although the DC charging is actually possible. As a result, a charging opportunity for the power storage device included in the vehicle may be lost.

The present disclosure is made to solve the above problem, and an object of the present disclosure is to reduce the loss of a charging opportunity for the power storage device included in the vehicle that is caused by virtue of the DC charger being a specific DC charger.

A vehicle charging system according to the present disclosure includes: a power storage device that is charged with direct-current (DC) power supplied from a charger outside a vehicle; a first relay connected between a first node connected to one electrode of the power storage device and a first power line connected to an electric load included in the vehicle; a second relay connected between a second node connected to an other electrode of the power storage device and a second power line connected to the electric load; a pre-charge circuit connected in parallel with the first relay and connected between the first node and the first power line; a charging port to which the charger is connected; a charge relay including a first charge relay for connecting the charging port and the first power line, and a second charge relay for connecting the charging port and the second power line; a voltage sensor that detects a voltage applied from the charger to the charging port; a communication device communicable with the charger; and a control device that controls charging of the power storage device. The pre-charge circuit includes a third relay and a resistor connected in series to the third relay. The communication device obtains a minimum output voltage from the charger, the minimum output voltage being a lower limit voltage that can be output from the charger. The control device performs a first charging control when the obtained minimum output voltage is lower than a lower limit charging voltage which is a lower limit voltage that is applicable to the power storage device, and performs a second charging control when the obtained minimum output voltage is higher than the lower limit charging voltage. In the first charging control, the control device closes the first relay, the second relay, and the charge relay to charge the power storage device. In the second charging control, the control device closes the second relay, the third relay, and the charge relay to start charging of the power storage device is started, and, when a detection value detected by the voltage sensor becomes a value corresponding to a voltage of the power storage device, the control device performs the first charging control.

According to the above configuration, if the minimum output voltage obtained by the communication device is higher than the lower limit charging voltage (the minimum output voltage>the lower limit charging voltage), the second charging control is performed, rather than not permitting charging of the power storage device right away. In the second charging control, initially, the pre-charge circuit is electrically connected to a charging path from the charger to the power storage device, and then charging of the power storage device is started.

If the charger is a specific DC charger, the charger may actually be able to output a voltage lower than the minimum output voltage obtained by the communication device, even though the minimum output voltage obtained by the communication device is higher than the lower limit charging voltage. For this reason, after the start of charging of the power storage device, a voltage actually applied to the charging port is detected by the voltage sensor to determine whether the detection value is a value corresponding the voltage of the power storage device. If the detection value is the value corresponding the voltage of the power storage device, at least the current power storage device can be charged with the charger. Thus, the first charging control is performed. As such, rather than based only on a result of the determination using the minimum output voltage obtained by the communication device (compatibility determination), the determination as to whether charging of the power storage device is to be permitted is made by performing the second charging control and determining whether the charger can actually output a voltage having a value corresponding the voltage of the power storage device. If the charger is able to output a voltage having a value corresponding the voltage of the power storage device, the power storage device is charged. As a result, even if the charger is a specific DC charger, the loss of a charging opportunity for the power storage device included in the vehicle, caused by virtue of the charger being a specific DC charger, can be reduced.

In a certain embodiment, in the second charging control, the control device closes the second relay, the third relay, and the charge relay to start charging of the power storage device, and stops the charging of the power storage device when a detection value detected by the voltage sensor after the charging is started becomes higher than the value corresponding to the voltage of the power storage device.

In the second charging control, if the voltage applied from the charger to the charging port after the start of charging of the power storage device is higher than the value corresponding to the voltage of the power storage device and the first charging control is performed with the pre-charge circuit being disconnected, an overcurrent may flow through the power storage device due to a differential pressure between the voltage applied from the charger to the charging port and the voltage of the power storage device. According to the above configuration, in the second charging control, if the voltage applied from the charger to the charging port is higher than the value corresponding to the voltage of the power storage device, that is, if the vehicle and the charger are not compatible, charging of the vehicle is not permitted. This can avoid the flow of an overcurrent, caused by the differential pressure, into the power storage device.

In a certain embodiment, a value corresponding to the voltage of the power storage device is used, instead of the lower limit charging voltage, to determine whether to perform the first charging control or perform the second charging control. In other words, the control device performs the first charging control when the obtained minimum output voltage is lower than the value corresponding to the voltage of the power storage device, and the control device performs the second charging control if the obtained minimum output voltage is higher than the value corresponding to the voltage of the power storage device.

According to the above configuration, depending on whether a value of the minimum output voltage is lower than the value corresponding the voltage of the power storage device, the determination is made as to whether to perform the first charging control or perform the second charging control. In other words, the determination as to whether to perform the first charging control or perform the second charging control is made based on the voltage of the power storage device before the start of charging. For example, one can contemplate a situation in which the minimum output voltage is higher than the lower limit charging voltage, but is lower than the voltage of the power storage device at the time the charging is started (the voltage of the power storage device>the minimum output voltage>the lower limit charging voltage). In such a case, at least the power storage device, at that time, can be charged with the charger. Rather than based only on the relation between the minimum output voltage and the lower limit charging voltage, the voltage of the power storage device at the time the charging of the power storage device is started is considered in determining whether to permit/not permit the charging, thereby increasing charging opportunities for the power storage device included in the vehicle.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments according to the present disclosure will be described, with reference to the accompanying drawings. Note that the same reference signs are used to refer to the same or like parts, and the description will not be repeated.

<Configurations of Vehicle and DC Charger>

Figure 1:
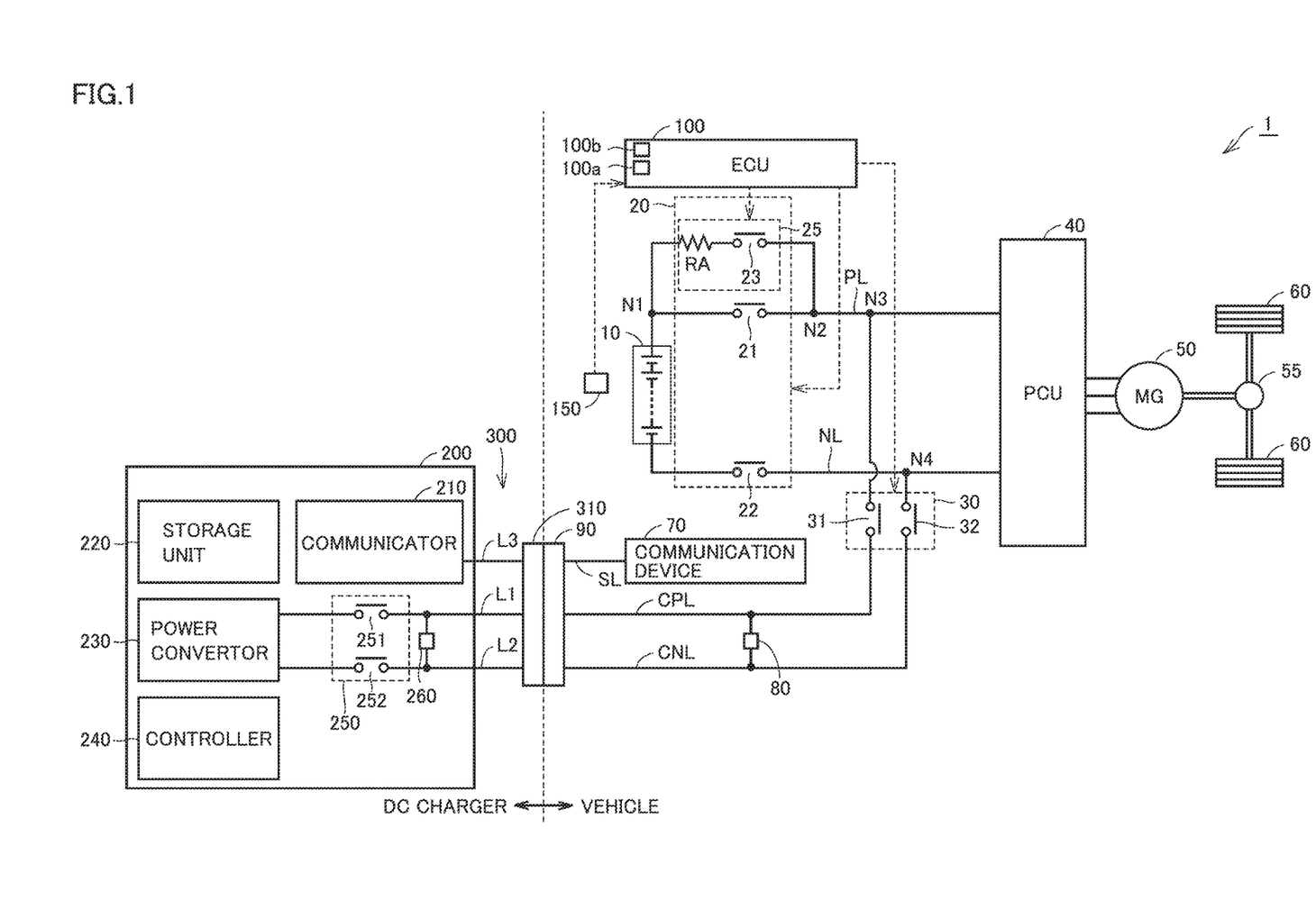
FIG. 1 is a block diagram showing a configuration example of a vehicle equipped with a charging system according to an embodiment and a direct-current (DC) charger.

FIG. 1 is a block diagram showing a configuration example of a vehicle 1 equipped with a charging system according to the present embodiment and a direct-current (DC) charger 200. While vehicle 1 according to the present embodiment will be described with reference to an electric vehicle, vehicle 1 is not limited to an electric vehicle, insofar as vehicle 1 can perform DC charging in which a power storage device mounted in the vehicle is charged with DC power supplied from DC charger 200. For example, vehicle 1 may be a plug-in hybrid vehicle or fuel cell vehicle.

DC charger 200 supplies the DC power to vehicle 1 via a charging cable 300. A charging connector 310 at the tip of charging cable 300 is connected to vehicle 1 (a charging port 90 described below) to perform the DC charging.

Referring to FIG. 1, vehicle 1 includes a power storage device 10, a system main relay device 20, a charge relay device 30, a power control unit (hereinafter, also referred to as "PCU") 40, a motor generator (hereinafter, also referred to as "MG") 50, a mechanical power transmission gear 55, driving wheels 60, a communication device 70, a voltage sensor 80, a charging port 90, an electronic control unit (ECU) 100, and a monitoring unit 150.

Power storage device 10 is mounted in vehicle 1 as a driving power source (i.e., power source) for vehicle 1. Power storage device 10 includes multiple batteries in a stack. The battery is, for example, a secondary battery, such as a nickel-metal hydride battery or a lithium-ion battery. The battery may also be a battery having a liquid electrolyte between the positive electrode and the negative electrode, or a battery having a solid electrolyte (all-solid-state battery). Note that power storage device 10 may be a rechargeable DC power supply, and a large capacitor can be employed.

System main relay device 20 is disposed between power storage device 10 and PCU 40. System main relay device 20 includes system main relays 21, 22, and a pre-charge circuit 25. System main relay 21 has one end connected to a positive terminal of power storage device 10, and the other end connected to a power line PL connected to PCU 40. System main relay 22 has one end connected to a negative terminal of power storage device 10, and the other end connected to a power line NL connected to PCU 40.

Pre-charge circuit 25 is connected in parallel with system main relay 21. Pre-charge circuit 25 includes a pre-charge resistor RA and a pre-charge relay 23 connected in series to pre-charge resistor RA. Pre-charge resistor RA has one end connected to a node N1 between the one end of system main relay 21 and the positive terminal of power storage device 10, and the other end connected to one end of pre-charge relay 23. Pre-charge relay 23 has the other end connected to a node N2 on power line PL, between the other end of system main relay 21 and PCU 40.

Note that system main relay 21 according to the present embodiment corresponds to one example of a "first relay" according to the present disclosure. System main relay 22 according to the present embodiment corresponds to one example of a "second relay" according to the present disclosure. Pre-charge relay 23 according to the present embodiment corresponds to one example of a "third relay" according to the present disclosure. While the present embodiment will be described with reference to pre-charge circuit 25 being disposed in parallel with system main relay 21, pre-charge circuit 25 may be disposed in parallel with at least one of system main relays 21, 22, and is not limited to be disposed in parallel with system main relay 21. Pre-charge circuit 25 may be disposed in parallel with system main relay 22. System main relay device 20 may include two pre-charge circuits 25 which are disposed in parallel with system main relays 21, 22, respectively.

PCU 40 collectively refers to power conversion devices for driving MG 50 using power supplied from power storage device 10. Examples of PCU 40 include an inverter for driving MG 50, a converter for stepping up the power output from power storage device 10 and supplying it to an inverter, etc.

MG 50 is an alternating-current (AC) rotating electric machine, an example of which is a permanent-magnet, synchronous motor which includes a rotor having a permanent magnet embedded therein. The rotor of MG 50 is mechanically connected to driving wheels 60 via mechanical power transmission gear 55. MG 50 receives AC power from PCU 40, thereby generating kinetic energy for causing vehicle 1 to travel. The kinetic energy generated by MG 50 is transmitted to mechanical power transmission gear 55. In order to slow down or stop vehicle 1, on the other hand, MG 50 converts the kinetic energy of vehicle 1 into electrical energy. The AC power generated by MG 50 is converted by PCU 40 into DC power and the DC power is supplied to power storage device 10. This allows regenerated energy to be stored in power storage device 10. As such, MG 50 causes a driving force or braking force of vehicle 1 to occur with an exchange of power with power storage device 10 (i.e., charging and discharging of power storage device 10).

Note that if vehicle 1 is a plug-in hybrid vehicle equipped with an engine (not shown) as a power source, the engine output power can be used as the driving force for driving vehicle 1, in addition to the output power of MG 50. Alternatively, vehicle 1 may further be equipped with a motor generator (not shown) for generating power using the engine output power, to generate power for charging power storage device 10 using the engine output power.

Charge relay device 30 is disposed between power storage device 10 and charging port 90. Charge relay device 30 includes a charge relay 31 and a charge relay 32. Charge relay 31 has one end connected to a node N3 on power line PL between node N2 and PCU 40, and the other end connected to charging port 90 via a power line CPL. Charge relay 32 has one end connected to a node N4 on power line NL between the other end of system main relay 22 and PCU 40, and the other end connected to charging port 90 via power line CNL.

Charging connector 310 at the tip of charging cable 300 of DC charger 200 is connected to charging port 90. Charging cable 300 includes power lines L1, L2 and a communication signal line L3. As charging connector 310 is connected to charging port 90, power lines L1, L2 and communication signal line L3 of DC charger 200 are connected to power lines CPL, CNL and a communication signal line SL of vehicle 1, respectively.

Voltage sensor 80 detects a potential difference between power line CPL and power line CNL. In other words, voltage sensor 80 detects the voltage applied from DC charger 200 to charging port 90. Voltage sensor 80 outputs a result of the detection to ECU 100.

Communication device 70 is communicable with a DC charger 200 (a communicator 210 described below) via communication signal line SL. The communications between vehicle 1 and DC charger 200 are performed according to, for example, a communication (hereinafter, also referred to as "CAN communication") adhering to a CAN (Controller Area Network) communication protocol, which is employed in the DC charging according to the CHAdeMO (registered trademark) method. Note that the communications between vehicle 1 and DC charger 200 are not limited to the CAN communication, and may be according to, for example, a power line communication (PLC), which is employed in the DC charging according to the CCS (combined charging system) method.

ECU 100 includes a central processing unit (CPU) 100a, a memory 100b, and an I/O buffer (not shown). ECU 100 receives signals from the sensors, outputs a control signal to each device, and controls each device. Note that these controls are not limited to be processed by software, and may be processed by configuring them in dedicated hardware (electronic circuit).

Memory 100b included in ECU 100 stores information on the power storage device, including a lower limit charging voltage which is a lower limit of voltage that is applicable to power storage device 10 during the charging of power storage device 10, and an upper limit charging voltage which is an upper limit of voltage that is applicable to power storage device 10 during the charging of power storage device 10. The lower limit charging voltage and the upper limit charging voltage are determined by the specification of power storage device 10, for example.

ECU 100 controls opening and closing of system main relay device 20 and charge relay device 30.

ECU 100 is capable of calculating SOC (State Of Charge) of power storage device 10. As the method of calculation of the SOC of power storage device 10, various known methods can be employed which use a voltage detected by monitoring unit 150 across a terminal of power storage device 10 and input and output currents of power storage device 10.

DC charger 200 includes a communicator 210, a storage unit 220, a power convertor 230, a controller 240, a relay device 250, and a voltage sensor 260.

Communicator 210 is communicable with communication device 70 of vehicle 1 through CAN communications via communication signal line L3.

Storage unit 220 stores information on output of DC charger 200, such as a minimum output voltage which is a lower limit voltage that can be output from DC charger 200, and a maximum output voltage which is an upper limit voltage that can be output from DC charger 200.

Power convertor 230 converts AC power supplied from an AC power supply (e.g., commercial system power supply) not shown into DC power for charging power storage device 10 included in vehicle 1. Power convertor 230 includes, for example, a converter, an inverter, an isolation transformer, a rectifier, etc.

Relay device 250 is disposed between power convertor 230 and power lines L1, L2. Specifically, relay device 250 includes a relay 251 and a relay 252. Relay 251 has one end connected to power convertor 230, and the other end connected to power line L1. Relay 252 has one end connected to power convertor 230, and the other end connected to power line L2.

Voltage sensor 260 detects a potential difference between power line L1 and power line L2. Voltage sensor 260 detects the voltage of power storage device 10 included in vehicle 1 when system main relay device 20 and the charge relay device included in vehicle 1 are both closed while charging connector 310 is connected to charging port 90, for example.

Controller 240 includes a CPU, a memory, and an I/O buffer (none of which are shown), and controls each component of DC charger 200. For example, controller 240 controls opening and closing of relay device 250.

Controller 240 also controls power convertor 230 during the DC charging so that vehicle 1 is supplied with power at a current according to the charging current requested from vehicle 1 and obtained via communicator 210. During the DC charging, controller 240 controls power convertor 230 so that a voltage having a value corresponding to the voltage of power storage device 10 at that time is applied to vehicle 1 (charging port 90). The value corresponding to the voltage of power storage device 10 refers to a value which is greater than or equal to the voltage of power storage device 10 and whose a difference from the voltage of power storage device 10 is within a given value. The given value is set as appropriate so as to prevent an overcurrent from flowing through power storage device 10 during the DC charging, the overcurrent resulting from a differential pressure between the voltage of power storage device 10 and the voltage applied from DC charger 200. The value corresponding to the voltage of power storage device 10 is set according to an equation: "the voltage of power storage device 10+(the requested charging current×the resistance of a charging path for vehicle 1 (the path from charging port 90 to power storage device 10))," for example. The resistance of the charging path of the vehicle 1 can be previously found from the specifications of vehicle 1, for example.

<DC Charging>

Figure 2:
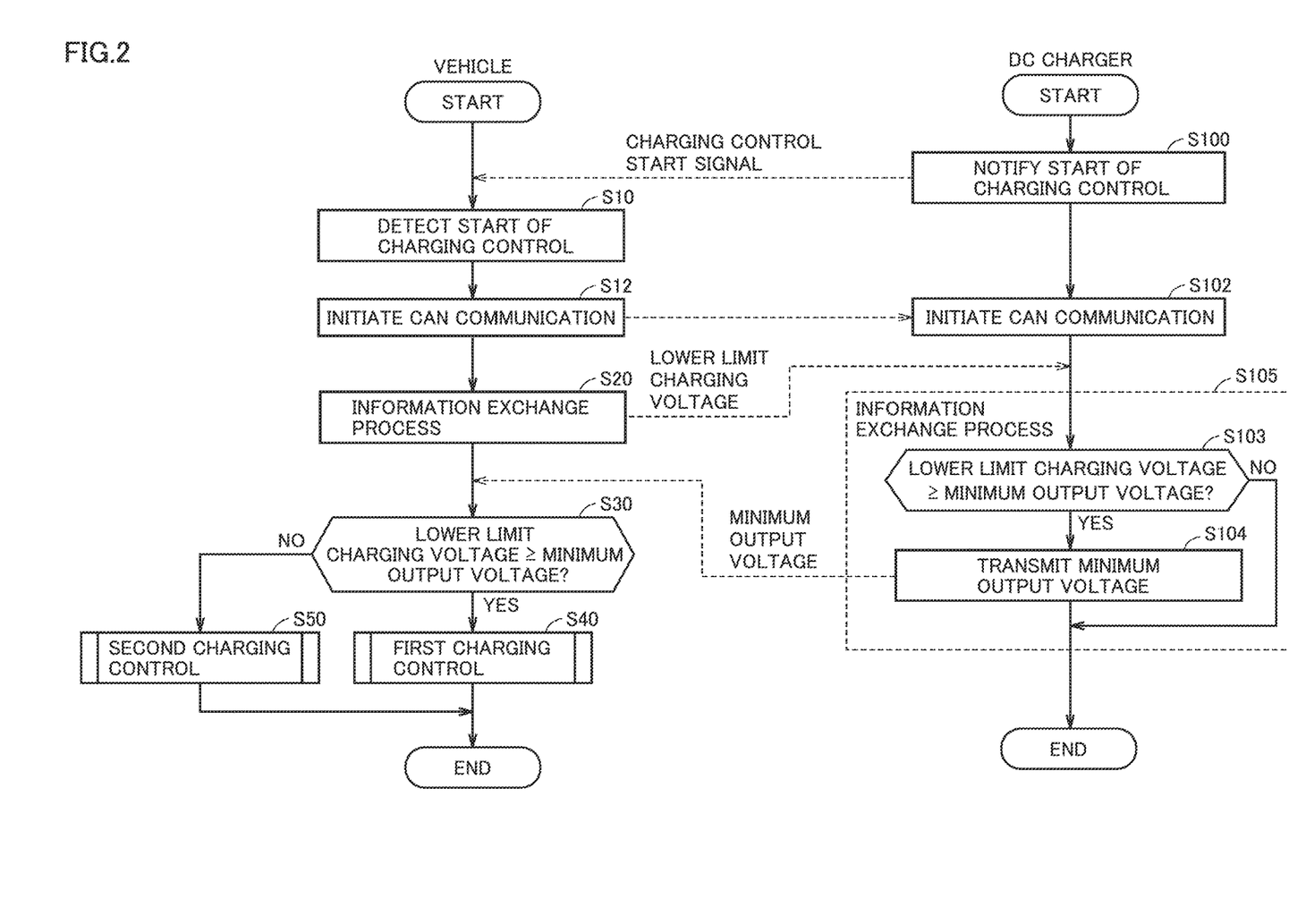
FIG. 2 is a flowchart illustrating steps of processing for the DC charging, which is performed by an ECU included in a vehicle and a controller included in the DC charger.

FIG. 2 is a flowchart illustrating steps of processing with respect to the DC charging performed by ECU 100 included in vehicle 1 and controller 240 included in DC charger 200. The processing illustrated in flowchart starts as a charging start operation is performed, for example, as a charging start button (not shown) on DC charger 200 is depressed while charging connector 310 of charging cable 300 is connected to charging port 90 of vehicle 1. The steps (hereinafter, a step will be abbreviated as "S") each illustrated in FIG. 2 and FIGS. 3 and 4 described below will be set forth as being implemented by software processing by ECU 100 and controller 240, but some or all of which may be implemented by hardware (electric circuits) fabricated within ECU 100 and/or controller 240.

In response to the charging start operation being performed (e.g., the charging start button being depressed), controller 240 included in DC charger 200 transmits a charging control start signal to vehicle 1 (S100).

Upon receipt of the charging control start signal, ECU 100 included in vehicle 1 detects that the charging start button has been depressed (S10).

Next, CAN communication is initiated between vehicle 1 and DC charger 200 (S12, S102).

As the CAN communication is initiated, an information exchange process is performed between vehicle 1 and DC charger 200 prior to the start of charging (S20, S105). Specifically, ECU 100 included in vehicle 1 transmits information on the power storage device, including at least the lower limit charging voltage, to DC charger 200 through the CAN communication (S20). The information on the power storage device may include, besides the lower limit charging voltage, information such as the upper limit charging voltage, the current SOC of power storage device 10, etc.

Controller 240 included in DC charger 200 receives the information on the power storage device, determines that vehicle 1 and DC charger 200 are compatible (S103), and then transmits information on the DC charger, including at least the minimum output voltage, to vehicle 1 through the CAN communication (S104). The information on the DC charger may include, besides the minimum output voltage, information such as the maximum output voltage, the maximum output current, etc. For example, when the minimum output voltage and the lower limit charging voltage are compared, vehicle 1 and DC charger 200 are determined as compatible if the minimum output voltage is less than or equal to the lower limit charging voltage. Note that if the information on the power storage device includes the upper limit charging voltage, vehicle 1 and DC charger 200 may be determined as compatible if a range of voltage at which the power storage device 10 can be charged (from the lower limit charging voltage to the upper limit charging voltage) falls within a range of voltage that can be output from DC charger 200 (from the minimum output voltage to the maximum output voltage).

Here, it has been found that, among existing DC chargers, there are specific DC chargers which transmit to vehicles the minimum output voltage that is set higher than the original value (the minimum output voltage that can actually be output) during the information exchange process (specifically, S104) prior to the start of charging. Although the specific DC chargers use the original minimum output voltage to determine the compatibility between vehicle 1 and DC charger 200 at S103, the specific DC chargers sets the minimum output voltage higher than the original value for transmission of the minimum output voltage to vehicle 1 at S104. In the following, where the original minimum output voltage of the specific DC charger and the minimum output voltage set higher than the original value need to be distinguished from each other, the original minimum output voltage of the specific DC charger will be referred to as "minimum output voltage A," and the minimum output voltage set higher than the original value will be referred to as "minimum output voltage B." Problems that can be caused when DC charger 200 is a specific DC charger will be described below one by one.

Upon receipt of the above information on the DC charger from DC charger 200, ECU 100 included in vehicle 1 determines the compatibility between vehicle 1 and DC charger 200 (S30). Specifically, ECU 100 included in vehicle 1 determines whether the minimum output voltage is less than or equal to the lower limit charging voltage. Note that if the information on the DC charger contains the maximum output voltage, ECU 100 may determine that they are compatible if a range of voltage at which the power storage device 10 can be charged (the lower limit charging voltage to the upper limit charging voltage) falls within a range of voltage that can be output from DC charger 200 (the minimum output voltage to the maximum output voltage).

The voltage applied from DC charger 200 to vehicle 1 (charging port 90) during the DC charging is set to a value corresponding to the voltage of power storage device 10 at that time so that there is no differential pressure greater than or equal to the given value between the voltage of power storage device 10 and the voltage applied from DC charger 200. However, considering the case where, for example, the DC charging is started while the voltage of power storage device 10 is at the lower limit charging voltage, a voltage higher than the lower limit charging voltage is to be applied from DC charger 200 to vehicle 1 if the minimum output voltage is higher than the lower limit charging voltage. In other words, DC charger 200 is unable to output the voltage (the lower limit charging voltage) having the value corresponding to the voltage of power storage device 10 at that time. Consequently, an overcurrent may flow through power storage device 10, resulting from the differential pressure between the voltage of power storage device 10 and the voltage to be applied from DC charger 200. In order to avoid such a situation, ECU 100 included in vehicle 1 does not permit the DC charging at S30 if the minimum output voltage is higher than the lower limit charging voltage.

If DC charger 200 is a specific DC charger, the information on the DC charger includes minimum output voltage B. Vehicle 1 having received minimum output voltage B uses minimum output voltage B to determine the compatibility between vehicle 1 and DC charger 200 at S30. In that case, even though DC charger 200 and vehicle 1 are determined as being not compatible because minimum output voltage B is higher than the lower limit charging voltage at S30 and the DC charging is therefore not permitted, it may happen that comparison of minimum output voltage A with the lower limit charging voltage, if made, indicates that minimum output voltage A is less than or equal to the lower limit charging voltage, indicating that DC charger 200 and vehicle 1 are compatible. In other words, if DC charger 200 is a specific DC charger, determination as to whether to permit the DC charging which is made based only on a result of determination of the compatibility using the information exchanged in the information exchange process, can result in the DC charging for vehicle 1 being not permitted although the DC charging is actually possible. As a result, a charging opportunity for power storage device 10 included in vehicle 1 may be lost.

Given this situation, in vehicle 1 which includes the charging system according to the present embodiment, if the minimum output voltage is less than or equal to the lower limit charging voltage at S30 (YES at S30), the DC charging is permitted and the first charging control is performed (S40). On the other hand, if the minimum output voltage is higher than the lower limit charging voltage (NO at S30), the second charging control is performed, rather than not permitting the DC charging right away (S50).

The first charging control is a control where, since the DC charging is permitted, a typical DC charging process is performed in which preparation for the DC charging is made and the DC charging is then started. Specifically, in the first charging control, system main relays 21, 22 and charge relay device 30 are closed, and the DC charging is then performed.

The second charging control is a control where a check process is performed in which it is determined whether DC charger 200 can actually output the voltage having the value corresponding to the voltage of power storage device 10, and if a result of the check process indicates that DC charger 200 can output the voltage having the value corresponding to the voltage of power storage device 10, the DC charging is permitted and the above first charging control is performed, and if the result of the check process indicates that DC charger 200 cannot output the voltage having the value corresponding to the voltage of power storage device 10, the DC charging is not permitted.

In the check process, pre-charge circuit 25 is electrically connected to a charging path from the charger to the power storage device, as a countermeasure to overcurrent, the DC charging is then started, and the voltage actually applied from DC charger 200 to charging port 90 of vehicle 1 is checked. Specifically, in the check process, system main relay 22, pre-charge relay 23, and charge relay device 30 are closed, and the DC charging is started. After the start of the DC charging, voltage sensor 80 detects the voltage applied from DC charger 200 to vehicle 1 (charging port 90).

The following two cases (1) and (2) are considered as a case where a result of the check process indicates that DC charger 200 is able to output the voltage having the value corresponding to the voltage of power storage device 10.

(1) If DC charger 200 is a specific DC charger, although minimum output voltage B informed of through the information exchange process is higher than the lower limit charging voltage, DC charger 200 is able to output a voltage that is actually lower than minimum output voltage B. In other words, if DC charger 200 is a specific DC charger, DC charger 200 can actually output the voltage having the value corresponding to the lower limit charging voltage. In this case, the DC charging for vehicle 1 is inherently possible with DC charger 200.

There is also a case (2) where, irrespective of whether DC charger 200 is a specific DC charger or not, a value corresponding to the current voltage of power storage device 10 is applicable, depending on the state of charge (SOC) of power storage device 10. The case is where, for example, the current voltage of power storage device 10 is higher than the minimum output voltage (the current voltage of the power storage device>the minimum output voltage>the lower limit charging voltage). In this case, the DC charging can be performed on at least the current power storage device 10 with DC charger 200.

Thus, the above (1) and (2) are the cases where the value detected by voltage sensor 80 is the value corresponding the voltage of power storage device 10, in which it is determined that at least the current power storage device 10 can be charged and thus the DC charging is permitted, system main relay 22, pre-charge relay 23, and charge relay device 30 are temporarily opened, and then the first charging control is performed.

In contrast, if the value detected by voltage sensor 80 is not the value corresponding to the voltage of power storage device 10, that is, if a result of the check process indicates that DC charger 200 is unable to output the voltage having the value corresponding to the voltage of power storage device 10, the DC charging is not permitted. Note that, in this case, even if the value detected by voltage sensor 80 is greater than the value corresponding to the voltage of power storage device 10, electrically connecting pre-charge circuit 25 to the charging path from DC charger 200 to power storage device 10 can inhibit flow of an overcurrent through power storage device 10 which is caused by the differential pressure between the voltage of power storage device 10 and the voltage to be applied from DC charger 200.

As such, even if the minimum output voltage is higher than the lower limit charging voltage, the second charging control is performed, rather than not permitting the DC charging right away. In the second charging control, if DC charger 200 is able to output the voltage having the value corresponding to the voltage of power storage device 10, the DC charging is performed. This can reduce the loss of a charging opportunity for power storage device 10 included in vehicle 1 that is caused by virtue of DC charger 200 being a specific DC charger. Moreover, even if the minimum output voltage is higher than the lower limit charging voltage, at least the current voltage of power storage device 10 may be applicable from DC charger 200 to vehicle 1. In such a case, the DC charging can be performed.

<Steps of First Charging Control>

Figure 3:
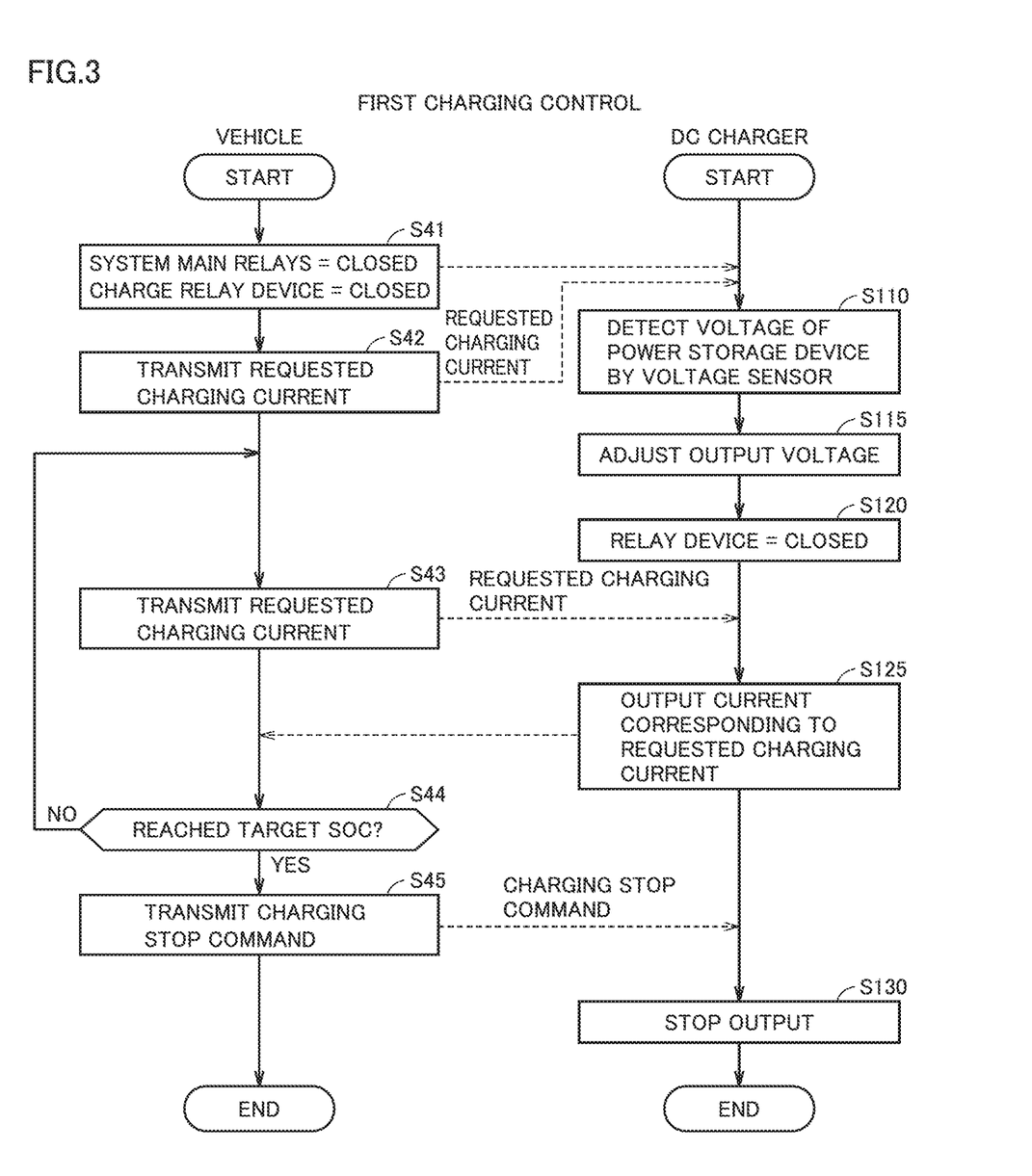
FIG. 3 is a flowchart illustrating steps of processing performed by ECU included in the vehicle and the controller included in the DC charger in a first charging control.

FIG. 3 is a flowchart illustrating steps of processing performed by ECU 100 included in vehicle 1 and controller 240 included in DC charger 200 during the first charging control.

ECU 100 included in vehicle 1 closes system main relays 21, 22, and charge relay device 30 (S41). This enables voltage sensor 260 included in DC charger 200 to detect the voltage of power storage device 10.

ECU 100 included in vehicle 1 transmits to DC charger 200 a requested charging current at which power storage device 10 can be charged (S42). The requested charging current is calculated from, for example, the output power of DC charger 200, and the current voltage of power storage device 10 obtained from monitoring unit 150.

Controller 240 included in DC charger 200 obtains a detection value of voltage sensor 260, and if detected the voltage of power storage device 10 (S110), controller 240 recognizes that charge relay device 30 in vehicle 1 has been closed.

As controller 240 included in DC charger 200 recognizes that charge relay device 30 has been closed, controller 240 controls power convertor 230 so that the output voltage of DC charger 200 has a value corresponding the voltage of power storage device 10 (S115). Specifically, the valve corresponding to the voltage of power storage device 10 at S115 is "the detection value of voltage sensor 260+(the requested charging current×the resistance of the charging path of vehicle 1)." The resistance of the charging path of vehicle 1 is obtained from vehicle 1 through the information exchange process (FIG. 2) prior to the start of charging, for example.

Controller 240 included in DC charger 200 then closes relay device 250 (S120).

ECU 100 included in vehicle 1 monitors the state of charge (SOC) of power storage device 10, and transmits to DC charger 200 a requested charging current at which power storage device 10 can be charged, at predetermined intervals (S43).

Controller 240 included in DC charger 200 supplies vehicle 1 with a current corresponding to the requested charging current, through constant current control (S125).

ECU 100 included in vehicle 1 monitors the SOC of power storage device 10 to determine whether the SOC of power storage device 10 has reached a target SOC (S44). The target SOC is set to full or SOC of 80%, for example. The target SOC can be set by a user, as appropriate, through operation of DC charger 200 or vehicle 1, for example.

ECU 100 included in vehicle 1 transmits the requested charging current to DC charger 200 at predetermined intervals until the SOC of power storage device 10 reaches the target SOC (NO at S44). Controller 240 included in DC charger 200 then adjusts the charging current at S125 every time it receives a requested charging current from vehicle 1.

If the SOC of power storage device 10 has reached the target SOC (YES at S44), ECU 100 included in vehicle 1 transmits a charging stop command to DC charger 200 (S45). The charging stop command is, for example, the requested charging current whose value is set to zero.

Upon receipt of the charging stop command, controller 240 included in DC charger 200 stops output (S130).

Note that alternatively/in addition to the determination as to whether the SOC of power storage device 10 has reached the target SOC, whether a preset charging time has elapsed since the start of the DC charging may be determined at S44.

<Steps of Second Charging Control>

Figure 4:
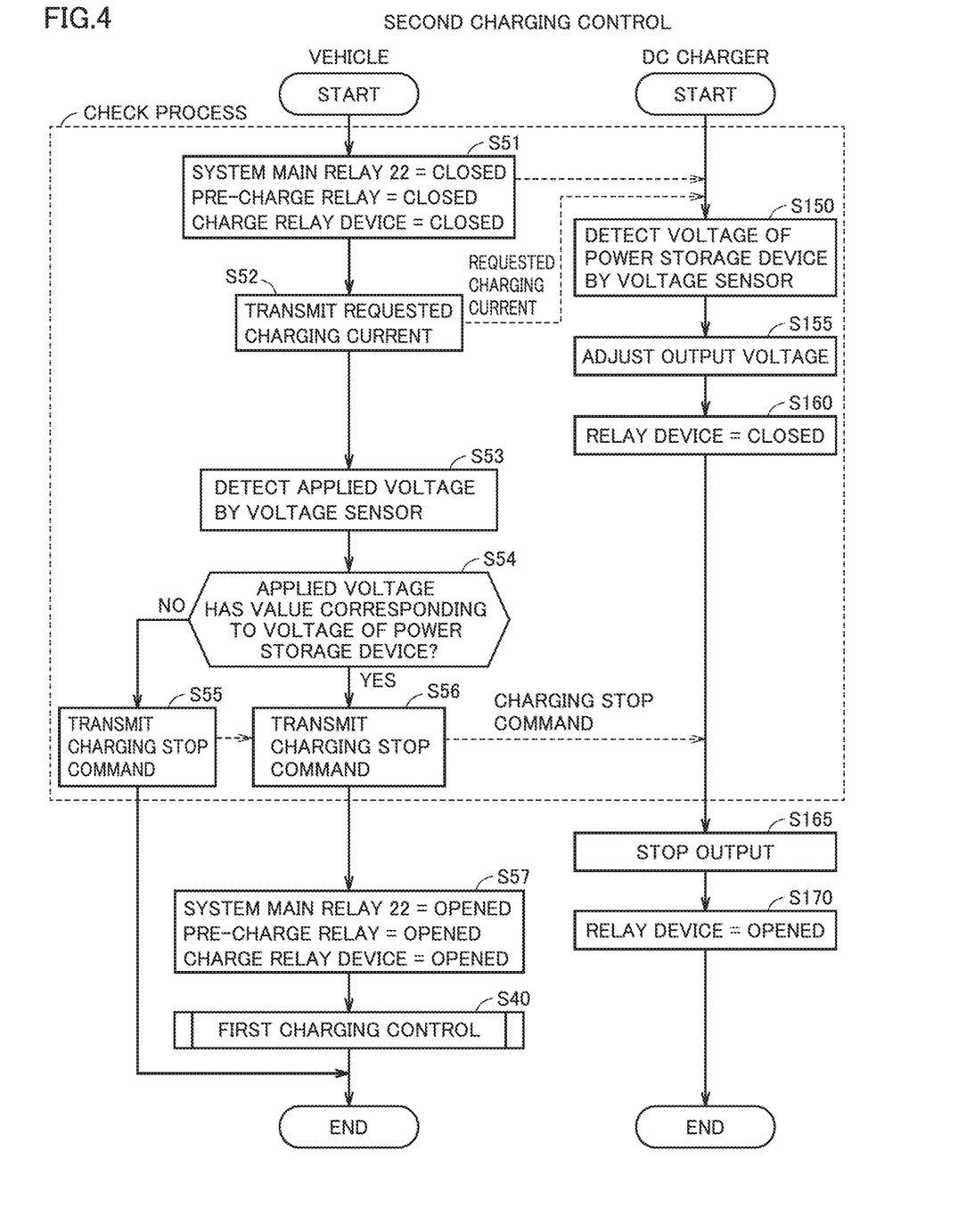
FIG. 4 is a flowchart illustrating steps of processing performed by ECU included in the vehicle and the controller included in the DC charger in a second charging control.

FIG. 4 is a flowchart illustrating steps of processing performed by ECU 100 included in vehicle 1 and controller 240 included in DC charger 200 during the second charging control.

ECU 100 included in vehicle 1 closes system main relay 22, pre-charge relay 23, and charge relay device 30 (S51). This enables voltage sensor 260 included in DC charger 200 to detect the voltage of power storage device 10.

ECU 100 included in vehicle 1 transmits to DC charger 200 a requested charging current at which power storage device 10 can be charged (S52).

Controller 240 included in DC charger 200 obtains a detection value of voltage sensor 260, and if detected the voltage of power storage device 10 (S150), controller 240 recognizes that charge relay device 30 in vehicle 1 has been closed.

As controller 240 included in DC charger 200 recognizes that charge relay device 30 has been closed, controller 240 controls power convertor 230 so that the output voltage has a value corresponding to the voltage of power storage device 10 (S155). Controller 240 included in DC charger 200 then closes relay device 250 (S160).

ECU 100 included in vehicle 1 obtains a detection value from voltage sensor 80, and detects the voltage applied from DC charger 200 to charging port 90 (S53).

Next, ECU 100 included in vehicle 1 compares the voltage detected at S53 with the voltage of power storage device 10 obtained from monitoring unit 150 (S54). Specifically, ECU 100 included in vehicle 1 determines whether the voltage detected at S53 has the value corresponding to the voltage of power storage device 10. Note that the voltage detected at S53 is determined to have the value corresponding to the voltage of power storage device 10 at S54 if the voltage detected at S53 is greater than or equal to the voltage of power storage device 10 and less than or equal to the voltage of power storage device 10. Specifically, the voltage detected at S53 is determined to have the value corresponding to the voltage of power storage device 10 at S54, if, for example, the voltage detected at S53 is greater than or equal to the voltage of power storage device 10 obtained from monitoring unit 150 and less than or equal to "the voltage of power storage device 10 obtained from monitoring unit 150+(the requested charging current×the resistance of the charging path of vehicle 1)." Detection errors of the various sensors may further be considered for the determination at S54.

If ECU 100 included in vehicle 1 determines that the voltage detected at S53 does not have the value corresponding to the voltage of power storage device 10 (NO at S54), vehicle 1 and DC charger 200 may not be compatible and thus an overcurrent may flow through power storage device 10 if pre-charge circuit 25 is electrically disconnected and the DC charging is performed. For this reason, ECU 100 transmits the charging stop command to DC charger 200 to end the process (S55).

In contrast, if ECU 100 included in vehicle 1 determines that the voltage detected at S53 has the value corresponding to the voltage of power storage device 10 (YES at S54), at least the power storage device 10 having the current state of charge can be charged with DC charger 200. For this reason, the process proceeds to a process for starting the DC charging.

Specifically, ECU 100 included in vehicle 1 transmits the charging stop command to DC charger 200 to stop the process temporarily (S56).

Upon receipt of the charging stop command, controller 240 included in DC charger 200 stops output (S165), and opens relay device 250 (S170).

As ECU 100 included in vehicle 1 confirms that the output of DC charger 200 has been stopped. ECU 100 opens system main relay 22, pre-charge relay 23, and charge relay device 30 (S57). In other words, ECU 100 included in vehicle 1 restores the states of system main relay device 20 and charge relay device 30 before the charging is started.

ECU 100 included in vehicle 1 and controller 240 included in DC charger 200 then perform the first charging control described above (S40).

As described above, vehicle 1 equipped with the charging system according to the present embodiment uses the minimum output voltage that is obtained from DC charger 200 in the information exchange process prior to the start of the DC charging, to determine the compatibility between vehicle 1 and DC charger 200. If vehicle 1 determines that they are compatible, vehicle 1 permits the DC charging and performs the first charging control. If vehicle 1 determines that they are not compatible, on the other hand, vehicle 1 performs the second charging control, rather than not permitting the DC charging right away.

Even if minimum output voltage B notified of in the information exchange process is higher than the lower limit charging voltage, DC charger 200 is actually able to output a voltage (minimum output voltage A) lower than minimum output voltage B if DC charger 200 is a specific DC charger. In other words, if DC charger 200 is a specific DC charger, DC charger 200 can actually output a voltage having the value corresponding to the lower limit charging voltage. In the check process in the second charging control, when the voltage having the value corresponding to the voltage of power storage device 10 is applied from DC charger 200, vehicle 1 permits the DC charging and performs the first charging control. As such, the second charging control is performed, thereby allowing the reduction in the loss of a charging opportunity for power storage device 10 included in vehicle 1 that is caused by virtue of DC charger 200 being a specific DC charger.

Furthermore, irrespective of whether DC charger 200 is a specific DC charger, there is a case where, even if the minimum output voltage is higher than the lower limit charging voltage (the minimum output voltage>the lower limit charging voltage), DC charger 200 is able to apply a value corresponding to the current voltage of power storage device 10, depending on the current SOC of power storage device 10. The case is, for example, where the current voltage of power storage device 10 is higher than the minimum output voltage (the current voltage of the power storage device>the minimum output voltage>the lower limit charging voltage). In such a case also, the DC charging can be performed if it is determined, by performing the second charging control, that DC charger 200 can perform the DC charging on at least the current power storage device 10. This can increase a charging opportunity for power storage device 10 included in vehicle 1.

(Variation)

In the embodiment, the minimum output voltage is compared with the lower limit charging voltage to determine the compatibility between vehicle 1 and DC charger 200 (S30 of FIG. 2). According to this, in all states of charge (SOC) of power storage device 10, it is determined whether DC charger 200 can be used to charge power storage device 10. However, for example, it may be determined whether DC charger 200 can be used to charge the current state of charge of power storage device 10. In other words, the current voltage of power storage device 10 may be compared with the minimum output voltage at S30 of FIG. 2.

For example, one can contemplate a situation in which at the time the DC charging is started, depending on the state of charge of power storage device 10, while the minimum output voltage is higher than the lower limit charging voltage, it is lower than the voltage of the power storage device at the time the DC charging is started (the voltage of the power storage device>the minimum output voltage>the lower limit charging voltage). In such a case, the DC charging can be performed with that charger at least at that time. Rather than based only on the relation between the minimum output voltage and the lower limit charging voltage, the voltage of the power storage device at the time the DC charging is started is considered in determining whether to permit/not permit the DC charging, thereby increasing charging opportunities for the vehicle.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle charging system, comprising:
a power storage device that is charged with direct-current (DC) power supplied from a charger outside a vehicle;
a first relay connected between a first node connected to one electrode of the power storage device and a first power line connected to an electric load included in the vehicle;
a second relay connected between a second node connected to an other electrode of the power storage device and a second power line connected to the electric load;
a pre-charge circuit connected in parallel with the first relay and connected between the first node and the first power line;
a charging port to which the charger is connected;
a charge relay including a first charge relay for connecting the charging port and the first power line, and a second charge relay for connecting the charging port and the second power line;
a voltage sensor that detects a voltage applied from the charger to the charging port;
a communication device communicable with the charger; and
a control device that controls charging of the power storage device, wherein
the pre-charge circuit includes a third relay and a resistor connected in series to the third relay,
the communication device obtains a minimum output voltage from the charger, the minimum output voltage being a lower limit voltage that can be output from the charger,
the control device performs a first charging control when the obtained minimum output voltage is lower than a lower limit charging voltage which is a lower limit voltage that is applicable to the power storage device, and performs a second charging control when the obtained minimum output voltage is higher than the lower limit charging voltage,
in the first charging control, the control device closes the first relay, the second relay, and the charge relay to charge the power storage device,
in the second charging control, the control device closes the second relay, the third relay, and the charge relay to start charging of the power storage device, and, when a detection value detected by the voltage sensor becomes a value corresponding to a voltage of the power storage device, the control device performs the first charging control.

2. The vehicle charging system according to claim 1, wherein
in the second charging control, the control device
closes the second relay, the third relay, and the charge relay to start charging of the power storage device, and stops the charging of the power storage device when the detection value detected by the voltage sensor becomes higher than the voltage of the power storage device.

3. The vehicle charging system according to claim 1, wherein
the lower limit charging voltage is the value corresponding to the voltage of the power storage device.

* * * * *